United States Patent
Burton

(10) Patent No.: US 6,885,693 B1
(45) Date of Patent: Apr. 26, 2005

(54) SYNCHRONIZATION IN DIGITAL DATA TRANSMISSION SYSTEMS

(75) Inventor: Mark Burton, Berkshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/516,171

(22) Filed: Feb. 29, 2000

(30) Foreign Application Priority Data

Mar. 6, 1999 (GB) .............................................. 9905194

(51) Int. Cl.⁷ ............................................. H44L 27/30
(52) U.S. Cl. .................... 375/142; 375/145; 375/149; 375/150; 375/343; 370/509; 370/512; 370/515
(58) Field of Search ................................. 375/142, 145, 375/149, 150, 324, 325, 327, 343, 362, 364–368; 370/509, 510, 512, 514–516

(56) References Cited

U.S. PATENT DOCUMENTS

| | | | | |
|---|---|---|---|---|
| 4,930,140 A | * | 5/1990 | Cripps et al. ............... | 370/342 |
| 5,090,028 A | * | 2/1992 | Crebouw .................... | 375/354 |
| 5,479,444 A | * | 12/1995 | Malkamaki et al. ........ | 375/231 |
| 5,727,018 A | * | 3/1998 | Wolf et al. .................. | 375/149 |
| 5,838,672 A | * | 11/1998 | Ranta .......................... | 370/335 |
| 5,960,048 A | * | 9/1999 | Haartsen ..................... | 375/366 |

FOREIGN PATENT DOCUMENTS

| | | |
|---|---|---|
| EP | 0 551 803 A1 | 7/1993 |
| GB | 2 309 864 | 8/1997 |
| GB | 2 309 866 | 8/1997 |

\* cited by examiner

*Primary Examiner*—Dac V. Ha
(74) *Attorney, Agent, or Firm*—Sughrue Mion, PLLC

(57) ABSTRACT

A channel estimation method for a digital telecommunication station is disclosed. A frequency correction burst is sought by scanning of the wanted channel. The frequency correction burst is used to provide coarse time and frequency synchronizations. A synchronization burst is received. Calculating the cross-correlation of the expected training sequence with the training sequence contained in said synchronous burst to obtain a channel estimate. A frequency error estimate is derived from the channel estimate, and the frequency error of the received burst is corrected in accordance with said frequency error estimate. The received synchronous burst is equalized. The frequency corrected symbols are used to refine the time and frequency synchronizations.

21 Claims, 4 Drawing Sheets

| 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|----|----|----|----|----|----|----|----|----|----|----|
| 1 | 0 | 1 | 1 | 1 | 0 | 0 | 1 | 0 | 1  | 1  | 0  | 0  | 0  | 1  | 0  | 0  | 0  | 0  | 0  |

B

| 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 |
|----|----|----|----|----|----|----|----|----|----|----|----|----|----|----|----|----|----|----|----|----|----|----|----|
| 0  | 1  | 0  | 0  | 0  | 0  | 0  | 0  | 1  | 1  | 1  | 1  | 0  | 0  | 1  | 0  | 1  | 1  | 0  | 1  | 0  | 1  | 0  | 0  |

C

| 45 | 46 | 47 | 48 | 49 | 50 | 51 | 52 | 53 | 54 | 55 | 56 | 57 | 58 | 59 | 60 | 61 | 62 | 63 | 64 |
|----|----|----|----|----|----|----|----|----|----|----|----|----|----|----|----|----|----|----|----|
| 0  | 1  | 0  | 1  | 0  | 1  | 1  | 1  | 0  | 1  | 1  | 0  | 0  | 0  | 0  | 1  | 1  | 0  | 1  | 1  |

(12) United States Patent
US 6,885,693 B1

SYNCHRONIZATION IN DIGITAL DATA TRANSMISSION SYSTEMS

BACKGROUND OF THE INVENTION

1. Field of the Invention

The present invention relates to digital data transmission, and more particularly to digital data decoders.

2. Description of the Related Art

Reference is made to U.S. Pat. Nos. 5,838,672 to Ranta and 5,479,444 to Malkamaki et al and "Mobile Radio Communications" published by John Wiley & Sons, Raymond Steele (Ed.) for a description of the prior art and technological background.

The following description is based on the GSM cellular communications system for which the invention is of particular utility. It will be apparent to those skilled in the art, however, that the invention may be applied to other systems of digital data transmission.

When a mobile phone terminal is to be used to communicate via a network, it must first obtain synchronization with the network. This is essentially a three step passive process. The mobile terminal must synchronize with the base station transmission in time, then frequency and then must read control information to enable the location updating procedure. In the following description it is assumed that a channel containing a broadcast control channel (BCCH) has been chosen.

The channel estimation method according to a prior art arrangements is shown in the flow chart of FIG. 1. At step 401, initially a Frequency Correction Burst (FCB), which is an unmodulated carrier, is sought by scanning of the wanted channel. When a FCB has been received the burst is used to provide coarse time and frequency synchronizations e.g. by means of a narrowband filter at step 402. The coarse time and frequency synchronizations are applied to the next stage of the synchronization process.

When a Synchronization Burst (SB) is received at step 403, it is processed and used to refine both time and frequency synchronization at step 404, 405. The SB contains channel coded information which enables the mobile terminal to access the network. After successfully decoding the SB the mobile terminal is fully synchronized to the network and communications can proceed.

The current arrangements for Synchronization Burst equalization are limited in performance by their intolerance to residual frequency offsets arising from the estimate of the frequency derived from the Frequency Burst. What this means in practice is that when a noisy estimate of the frequency offset is derived from the Frequency Burst processing, then the probability of successful decoding of the Synchronization burst is significantly reduced. Under these conditions the mobile terminal is likely to fail to synchronize with the network.

Existing arrangements for Synchronization Burst decoding are based on the conventional techniques of channel estimation, equalization and convolutional decoding. The channel estimation technique used depends upon calculating the cross-correlation of the expected 64 symbol training sequence with the 64 symbol training sequence received in the synchronization burst. This cross Correlation gives an estimate of the propagation channel. For a channel where no frequency error is present such existing arrangements provide a satisfactory channel estimate.

This is typically not the case, however, on a real fading channel when the mobile terminal is trying to gain initial synchronization with the network. For a fading channel a residual frequency error is carried over from the imperfect frequency estimation derived by the initial Frequency Burst detection. A residual frequency error on the received symbols of the Synchronization Burst is manifest as a constant, accumulating phase offset as a function of time.

This in turn affects the channel estimate obtained by performing a cross correlation of the received Synchronization Burst symbols with the expected training sequence so as to cause a degradation of the equalization procedure. When the bit error rate for the equalized burst exceeds that which can successfully be tolerated by the channel coding used to protect the information contained in the SB, then the synchronization will fail.

SUMMARY OF THE INVENTION

It is an object of the present invention to provide a channel estimation method which is capable of performing a channel estimation with successfully even on a fading channel.

According to the present invention there is provided a channel estimation method for a digital telecommunication station in which a received training sequence is cross correlated with a selected subset of an expected training sequence to obtain a channel estimate and a frequency error estimate is derived from said channel estimate and the frequency error of the received burst is corrected in accordance with said frequency error estimate.

The above and other objects, features and advantages of the present invention will become apparent from the following description with reference to the accompanying drawings which illustrate examples of the present invention.

BRIEF DESCRIPTION OF THE DRAWINGS

FIG. 3 shows a GSM Synchronization Burst training sequence; and

DETAILED DESCRIPTION OF THE PREFERRED EMBODIMENTS

Figure 1:
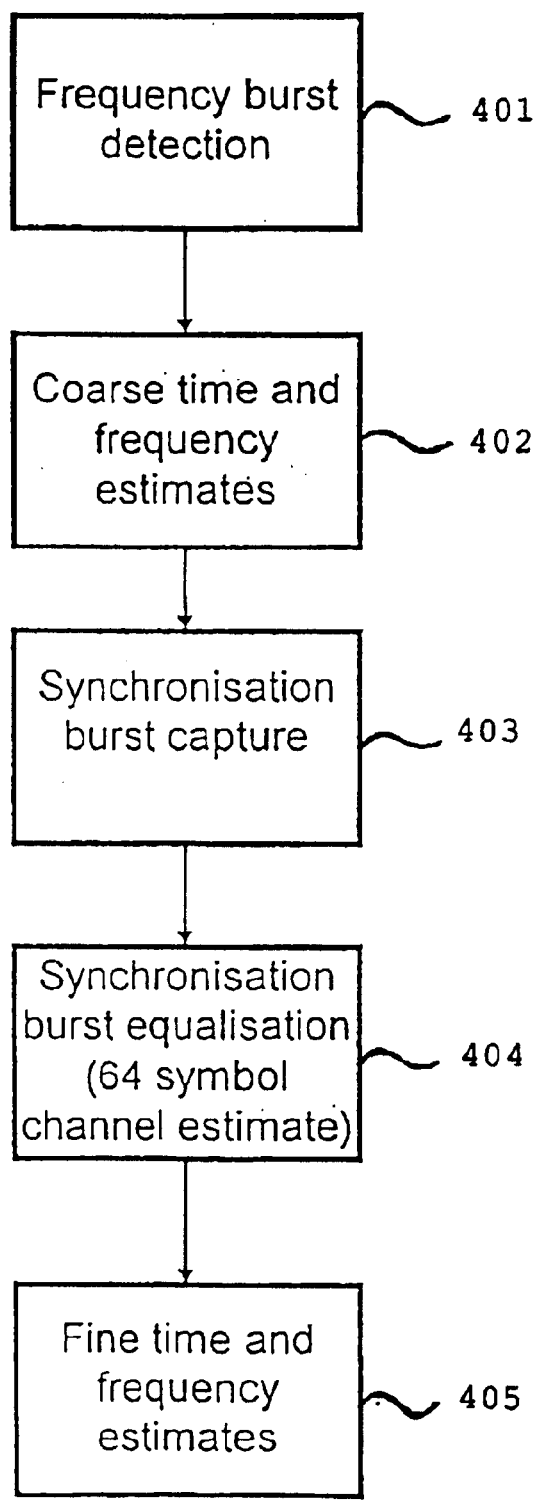
FIG. 1 is a flow diagram showing a prior art Synchronization Burst decoder.
Figure 2:
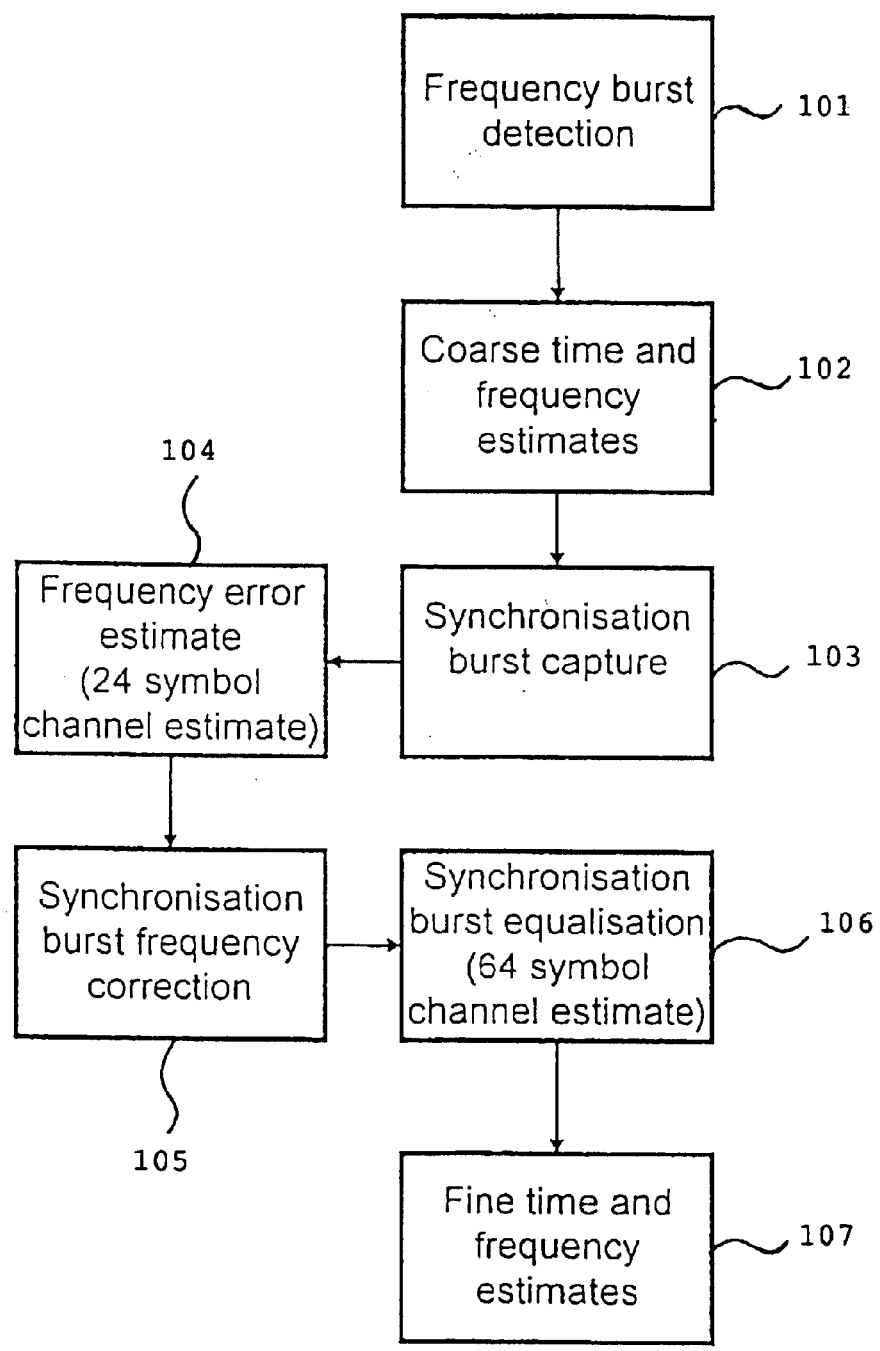
FIG. 2 is a flow diagram showing a Synchronization Burst decoder according to the present invention.

A means for an improvement over the prior art methods in the tolerance to residual frequency error of the Synchronization Burst decoding process is illustrated in the flow diagram of FIG. 2. The frequency burst detection (step 101) and coarse time and frequency estimates (step 102) are obtained in the usual manner in accordance with prior art methods.

A GSM training sequence is shown in FIG. 3 with each of the symbols labelled 1 to 64. It is convenient here to show the training sequence as comprising three sections labelled A, B and C. The full sequence of symbols from 1 to 64 is transmitted consecutively, however, and FIG. 3 serves to illustrate as section B the 24 symbol sub set used to obtain the frequency error estimate. The symbols 1 through 64 would be the training sequence expected to be received by the mobile phone terminal.

Returning to FIG. 2, at capture of the synchronization burst (step 103) the received training sequence is cross correlated with the subset B of the expected training sequence. This cross correlation makes use of the auto correlation property of a subset B of the Synchronization Burst training sequence. Although this 24 symbol sequence is not perfectly auto correlated, it is almost so.

Therefore the cross correlation of the received symbols is performed using the 24 symbol subset B of the training sequence. This cross correlation provides a channel estimate which has been generated from a more temporally localized sequence of received symbols. The effects arising from the phase error due to a residual frequency offset are therefore reduced and the channel estimate is better than it would have been had the full 64 symbols of the training sequence been used.

The next step 104 is to obtain a frequency error estimate using the 24 symbol based channel-estimate in conjunction with the a prior 64 symbol training sequence. This can be achieved by using a standard technique such as a second order phase locked loop (PLL), locked in frequency and phase to the reference (expected) training sequence symbols. A block diagram of a suitable PLL is shown in FIG. 4.

Figure 4:
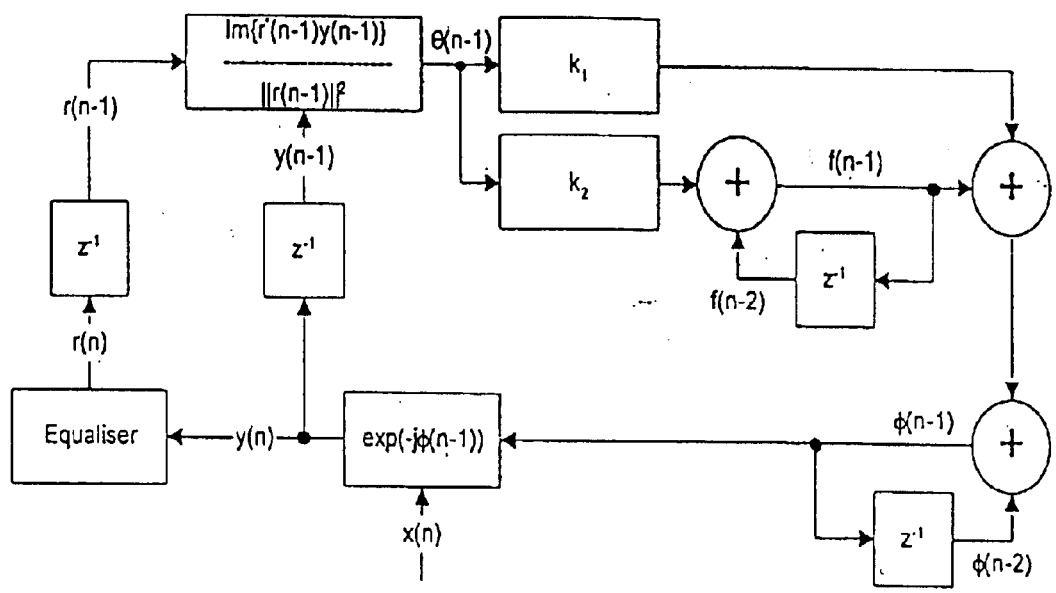
FIG. 4 is a Doppler tracking phase locked loop.

The Doppler Tracking PLL of FIG. 4 in the equalizer is of the decision directed 2nd order type. This provides a PLL which is locked in both phase and frequency to the reference symbols. The PLL provides a phase correction to the next received symbol to be equalized.

The characteristic equations describing the PLL are:

$$\phi(n-1)=\phi(n-2)+f(n-1)+k_1 0(n-1)$$

$$f(n-1)=f(n-2)+k_2 0(n-1)$$

where $k_1$ is the "phase" loop gain and $k_2$ is the "frequency" loop gain. The open loop transfer function is given by:

$$\frac{\phi(z)}{\theta(z)} = \frac{k_2}{1-2z^{-1}+z^{-2}} + \frac{k_1}{1-z^{-1}}$$

The values $k_1=0.08$ $k_2=0.08/29.0$ for the loop gains $k_1$ and $k_2$, were determined by trial and error using a Matlab model, where the main criterion used was the convergence of the loop within the available number of symbols in a Normal Burst.

In this example, for Normal Burst equalization the PLL is used solely for phase correction during equalization. For Synchronization Bursts, however, the PLL is used in addition for performing an initial frequency estimate from the training sequence. This initial frequency estimate is then used to apply a frequency correction to the set of received symbols before equalization proper is performed.

After application of the chosen frequency estimate algorithm the resultant frequency estimate is then used to correct all symbols of the received burst at step 105. The performance of the frequency estimate algorithm must exceed the performance of the FCB frequency estimation algorithm so that the applied correction will improve the residual frequency error present in the corrected received symbols. After the frequency correction has been applied to the whole buffer of received symbols a second channel estimate is calculated at step 106.

This second channel estimate is made by taking the cross correlation of the 64 frequency corrected symbols of the received training sequence and the 64 symbols of the expected training sequence of the Synchronization Burst. This channel estimate should therefore be better than the 24 symbol channel estimate previously calculated and better also than the 64 symbol channel prior art estimate usually obtained. This is due to the reduction of residual frequency error and use of all the symbols of the training sequence in the cross correlation. Equalization of the received SB then proceeds in the usual manner at step 106 using the frequency corrected symbols. The frequency corrected symbols are used to refine the time and frequency synchronizations at step 107.

Proposals exist for varying or adapting training sequences e.g. as described in U.S. Pat. No. 5,479,444, U.S. Pat. No. 5,838,672 and WO 9807291. A selected subset of an adaptive training sequence may be used for cross correlation with an expected training sequence to provide an initial estimate of frequency error for correction of the frequency of the received burst in accordance with the initial estimate of the frequency error.

A training sequence may also be adapted to provide a subset of the training sequence with improved auto correlation properties.

While a preferred embodiment of the present invention has been described using specific terms, such description is for illustrative purposes only, and it is to be understood that changes and variations may be made without departing from the spirit or scope of the following claims.

What is claimed is:

1. A channel estimation method for a digital telecommunication station, comprising:

detecting a frequency correction burst by scanning of a wanted channel;

providing time and frequency synchronizations by using said frequency correction burst; receiving a synchronization burst;

cross correlating a received training sequence contained in said synchronous burst with a selected subset of an expected training sequence to obtain a channel estimate, wherein the received training sequences is a 64 bit training sequence of a GSM system included in said synchronization burst transmitted by a base station of a cellular telephone network, and said selected subset comprises the 21st through the 44th symbols of said received training sequence;

deriving a frequency error estimate from said channel estimate;

correcting the frequency error of the received burst in accordance with said frequency error estimate;

equalizing the received synchronous burst; and providing time and frequency synchronizations again by using said corrected frequency correction burst.

2. A channel estimation method according to claim 1, wherein the training sequence is an adaptive training sequence.

3. A channel estimation method according to claim 1, wherein the training sequence is an adaptive training sequence.

4. A channel estimation method according to claim 3, wherein the selected subset is an adaptive subset.

5. A channel estimation method according to claim 1, wherein the selected subset is an adaptive subset.

6. A channel estimation method according to claim 1, wherein the selected subset is an adaptive subset.

7. A channel estimation method according to claim 1, wherein the frequency error estimate is obtained by a Doppler tracking phase locked loop.

8. A channel estimation method according to claim 1, wherein the frequency error estimate is obtained by a Doppler tracking phase locked loop.

9. A channel estimation system for digital communications, comprising:
  a frequency detection element for detecting a frequency correction burst in a desired channel located by scanning, said frequency detection element further detecting from the frequency correction burst selective time and frequency coordination data;
  a receiver element for receiving a synchronization burst of data;
  a cross-correlation element within said receiver element for correlating a training sequence contained in said synchronization burst of data with a selected subset of an expected training sequence to obtain a channel estimate;
  deriving a frequency error estimate from said channel estimate by processing said channel estimate in conjunction with a prior symbol training sequence;
  correcting the frequency error of the received burst in accordance with said frequency error estimate;
  equalizing the received synchronization burst; and
  providing time and frequency synchronization again by using said corrected frequency correction burst.

10. A channel estimation system according to claim 9, wherein the received training sequence is part of the signal within a synchronization burst of data transmitted by a base station of a cellular telephone network.

11. A channel estimation system according to claim 10, wherein the received training sequence is the 64 bit training sequence of a GSM system.

12. A channel estimation system according to claim 10, wherein the selected subset comprises the 21st through the 44th symbols of the training sequence.

13. A channel estimation system according to claim 10, wherein the training sequences is an adaptive training sequence.

14. A channel estimation system according to claim 13, wherein the selected subset is an adaptive subset.

15. A channel estimation system according to claim 10, wherein the selected subset is an adaptive subset.

16. A channel estimation system according to claim 10, wherein the frequency error estimate is obtained by a Doppler tracking phase locked loop.

17. A channel estimation system according to claim 9, wherein the training sequence is an adaptive training sequence.

18. A channel estimation system according to claim 9, wherein the selected subset is an adaptive subset.

19. A channel estimation system according to claim 9, wherein the frequency error estimate is obtained by a Doppler tracking phase locked loop.

20. A channel estimation method for a digital telecommunication station, comprising:
  detecting a frequency correction burst by scanning of a wanted channel;
  providing time and frequency synchronizations by using said frequency correction burst;
  receiving a synchronization burst;
  cross correlating a received training sequence contained in said synchronous burst with a selected subset of an expected training sequence to obtain a channel estimate;
  deriving a frequency error estimate from said channel estimate by processing said channel estimate in conjunction with a prior training sequence;
  correcting the frequency error of the received burst in accordance with said frequency error estimate;
  equalizing the received synchronous burst; and
  providing time and frequency synchronization again by using said corrected frequency correction burst.

21. A channel estimation system for digital communications, comprising:
  a frequency detection element for detecting a frequency correction burst in a desired channel located by scanning, said frequency detection element further detecting from the frequency correction burst selective time and frequency coordination data;
  a receiver element for receiving a synchronization burst of data;
  a cross-correlation element within said receiver element for correlating a training sequence contained in said synchronization burst of data with a selected subset of an expected training sequence to obtain a channel estimate, wherein the training sequence is a 64 bit training sequence of a GSM system included in said synchronous burst transmitted by a base station of a cellular telephone network, and said selected subset comprises the 21st through the 44th symbols of said received training sequence;
  deriving a frequency error estimate from said channel estimate;
  correcting the frequency error of the received burst in accordance with said frequency error estimate;
  equalizing the received synchronization burst; and
  providing time and frequency synchronizations again by using said corrected frequency correction burst.

* * * * *